United States Patent [19]
Chou et al.

[11] Patent Number: 5,755,484
[45] Date of Patent: May 26, 1998

[54] VEHICLE DOOR INTRUSION BEAM

[75] Inventors: Shui-Fang Chou, Troy; Kristina Janina Khami, Farmington Hills; Shahid Hussain, Detroit, all of Mich.

[73] Assignee: Ford Global Technologies, Inc., Dearborn, Mich.

[21] Appl. No.: 900,071

[22] Filed: Jul. 24, 1997

Related U.S. Application Data

[63] Continuation of Ser. No. 740,180, Oct. 28, 1996, abandoned.

[51] Int. Cl.$^6$ ............................................ B60J 5/04
[52] U.S. Cl. .......................... 296/146.6; 296/146.7; 248/68.1
[58] Field of Search ................. 296/146.6, 146.7, 296/188; 49/502; 293/146; 248/68.1

[56] References Cited

U.S. PATENT DOCUMENTS

| | | | |
|---|---|---|---|
| 545,561 | 9/1895 | Weeden | 248/68.1 |
| 566,544 | 8/1896 | Smith | 248/68.1 |
| 831,245 | 9/1906 | Share | 248/68.1 |
| 1,355,862 | 10/1920 | Spellman | 248/68.1 |
| 1,561,074 | 11/1925 | Harvey | 293/146 |
| 1,647,766 | 11/1927 | Banschbach | 293/146 X |
| 1,697,498 | 1/1929 | Faggol | 293/146 |
| 1,930,985 | 10/1933 | Schulz | 256/13.1 |
| 2,189,792 | 2/1940 | Greulich | 256/13.1 |
| 3,120,938 | 2/1964 | Lucas | 248/68.1 |
| 3,216,025 | 11/1965 | Roll | 248/68.1 |
| 3,441,986 | 5/1969 | Pritchard | 248/68.1 |
| 3,868,141 | 2/1975 | Johnson | 49/502 |
| 3,894,706 | 7/1975 | Mizusawa | 248/68.1 |
| 4,684,166 | 8/1987 | Kanodia | 296/188 X |
| 4,796,946 | 1/1989 | Wilson et al. | 296/146.6 |
| 4,850,636 | 7/1989 | McLaren et al. | 49/602 X |
| 5,172,877 | 12/1992 | Hattori et al. | 248/68.1 |
| 5,383,318 | 1/1995 | Kelley et al. | 248/68.1 |
| 5,544,930 | 8/1996 | Stedman | 296/146.6 |

FOREIGN PATENT DOCUMENTS

| | | | |
|---|---|---|---|
| 000603445 A1 | 6/1994 | European Pat. Off. | 296/146.6 |
| 3011345 | 10/1981 | Germany | 296/188 |
| 3321758 | 12/1984 | Germany | 248/68.1 |
| 0104468 | 6/1982 | Japan | 296/146.6 |
| 0052525 | 2/1989 | Japan | 296/188 |
| 893 448 | 4/1962 | United Kingdom | 248/68.1 |
| 1060590 | 3/1967 | United Kingdom | 248/68.1 |
| 1209021 | 10/1970 | United Kingdom | 248/68.1 |
| 2080676 | 2/1982 | United Kingdom | 248/68.1 |

*Primary Examiner*—Dennis H. Pedder
*Attorney, Agent, or Firm*—Steve A. Maynard

[57] ABSTRACT

A vehicle door has a trim panel, an attached inner door panel, and an attached outer door panel defining a cavity therein, and an energy management device within the cavity. The device has two or more elongated deflectable beam members, each being attached to the vehicle door within the door cavity. One or more clips engage the beam members, and are adjustably positionable along the longitudinal axes of the beam members, so as to provide a predetermined substantially planar deflection upon imposition of a lateral displacement. One or more tab members are disposed on the inboard surface of the clip, so as to initiate deployment of the inner trim panel prior to compression of the vehicle door upon imposition of a lateral displacement.

4 Claims, 2 Drawing Sheets

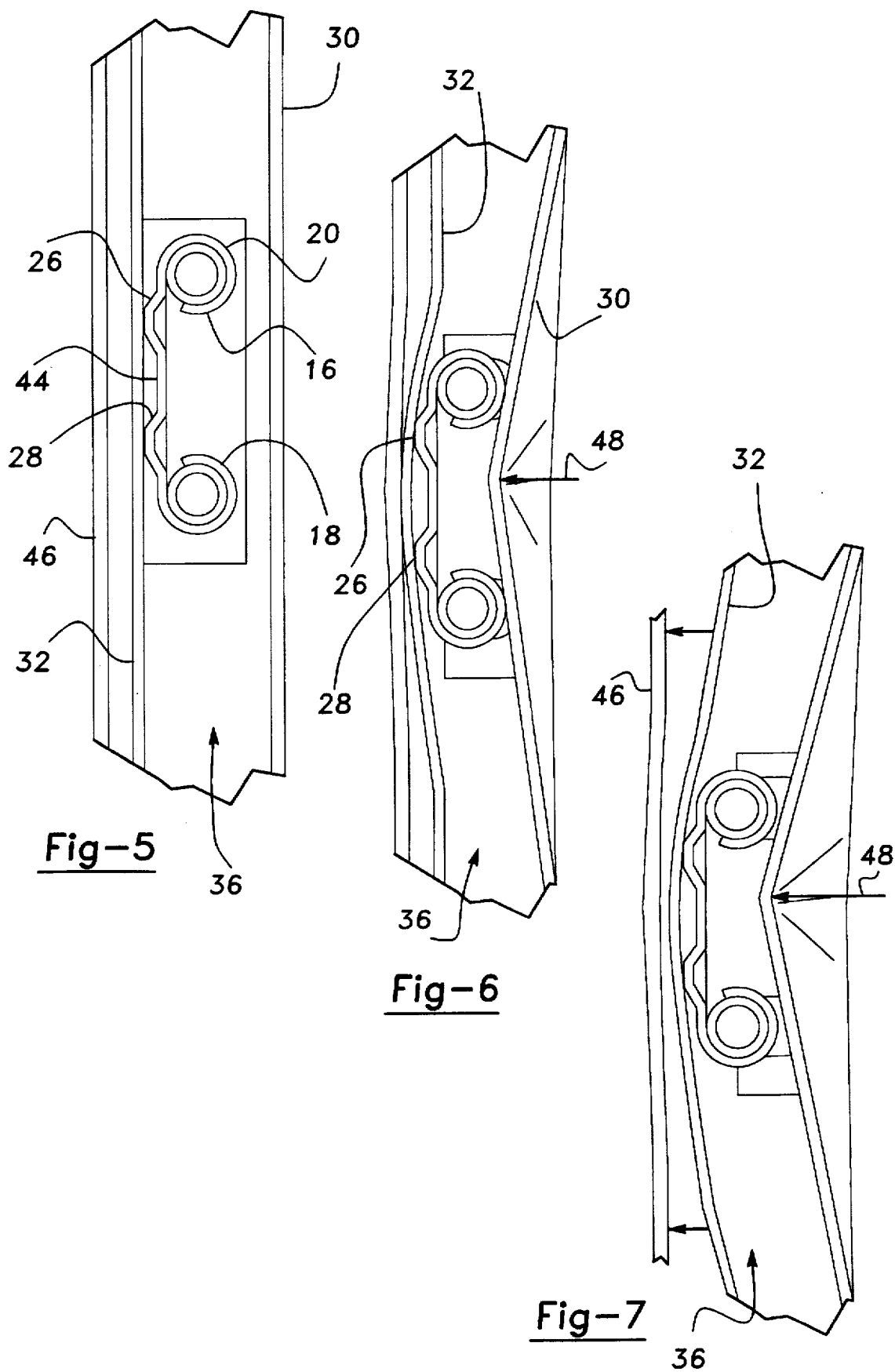

VEHICLE DOOR INTRUSION BEAM

This is a continuation of application Ser. No. 08/740,180 filed Oct. 28, 1996, now abandoned.

FIELD OF THE INVENTION

The present invention relates to a vehicle impact beam assembly and, more particularly, to an impact beam assembly for use in a side door of an automobile.

BACKGROUND OF THE INVENTION

Since impact beams and assemblies have come into widespread use in side doors of automotive vehicles, efforts have advanced to effectuate the goals of energy management relative to manufacturing ease and part cost. These assemblies have included various configurations of structural steel members extending between the front and rear vertically extending walls of a vehicle door. These structural steel members have taken the form of steel rod or tubing, as well as forged or stamped sheet metal of various cross sectional configurations.

Certain disadvantages, however, are noted in previous designs of impact beams and assemblies. When steel tube is used, depending on the lateral load deflection characteristics of the particular automobile, typically more than one tube must be utilized in order to meet desired energy management criteria. Upon impact however, the tubes have the potential to deform independently, resulting in the loss of the intended design lateral load-deflection profile. A more predictable load-deflection profile is obtained by utilizing stamped sheet metal. However, depending on the side impact intrusion characteristics of the particular automobile, variously configured cross-sections must be utilized in order to obtain a desired load-deflection profile. The stamping process adds to the unit price as a result of tooling and manufacturing process costs and even more so if multiple configurations are required for various car lines. What is desired is to have a relatively inexpensive, yet predictably deformable side impact device. None of the prior art devices provide such advantages.

SUMMARY OF THE INVENTION

Responsive to the deficiencies in the prior art, the vehicle door of the present invention includes a side door impact beam assembly that includes two or more elongated deflectable beam members being attached within a vehicle door. One or more clip members are attached to the upper and lower most beam members, the clips being adjustably positionable along the longitudinal axes of the beams so as to provide a predetermined substantially planar deflection upon imposition of a lateral load. The vehicle door has a trim panel, an inner panel, and an outer panel attached thereto. In an alternative embodiment, one or more tab members are disposed on an inboard surface of the clip adjacent to the inner door panel to initiate deployment of the inner trim panel prior to compression of the vehicle door upon imposition of a lateral load.

A feature of the present invention is a clip mounted on a pair of beam members, the clip functioning to constrain relative vertical and horizontal displacement between the beam members.

An advantage of the present invention is the provision of a predetermined substantially planar displacement of both beam members upon imposition of a lateral load.

BRIEF DESCRIPTION OF THE DRAWINGS

These and other advantages and features of the vehicle door assembly of the present invention will be apparent to those skilled in the automotive vehicle body arts upon reading the following description with reference to the accompanying drawings, in which:

FIG. 5 is a cross-sectional view of an impact beam assembly according to an alternative embodiment of the present invention showing the clip in a neutral position;

FIG. 6 is a cross-sectional view of an impact beam assembly according to an alternative embodiment of the present invention showing the clip contacting the inner door panel upon imposition of a lateral load; and FIG. 7 is a cross-sectional view of an impact beam assembly according to an alternative embodiment of the present invention showing the clip deforming the inner trim panel to a degree sufficient to release the inner trim panel.

DETAILED DESCRIPTION OF THE PREFERRED EMBODIMENT

Figure 1:
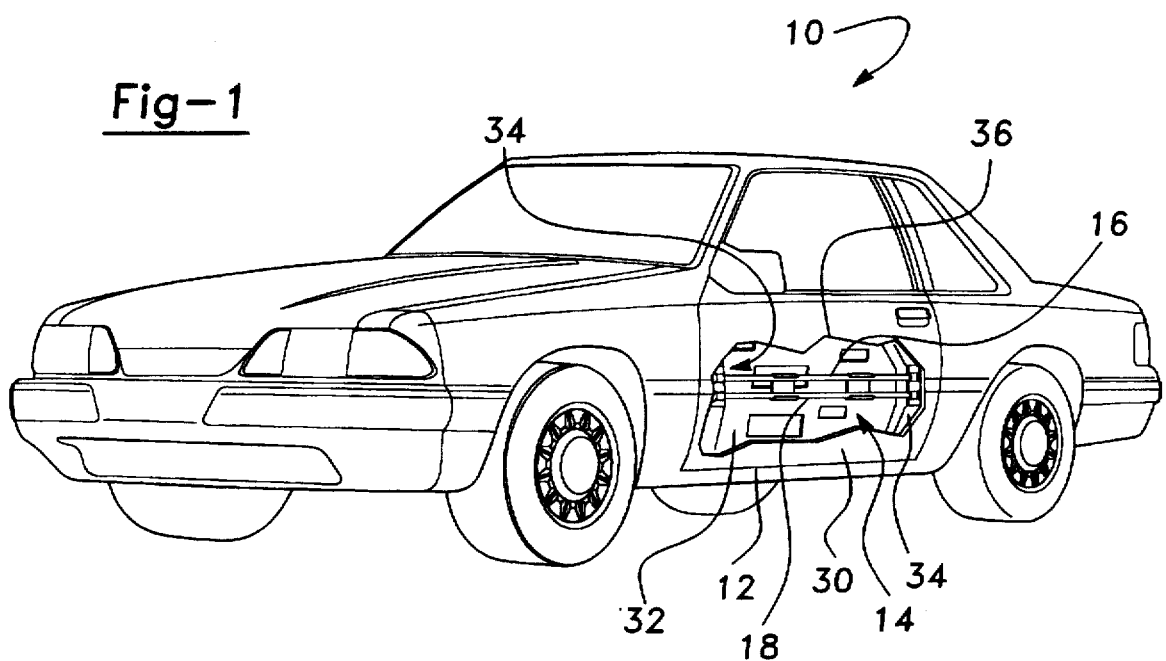
FIG. 1 is a perspective view of an automobile with a cut-away view of the vehicle door illustrating an impact beam assembly in accordance with the present invention.
Figure 2:
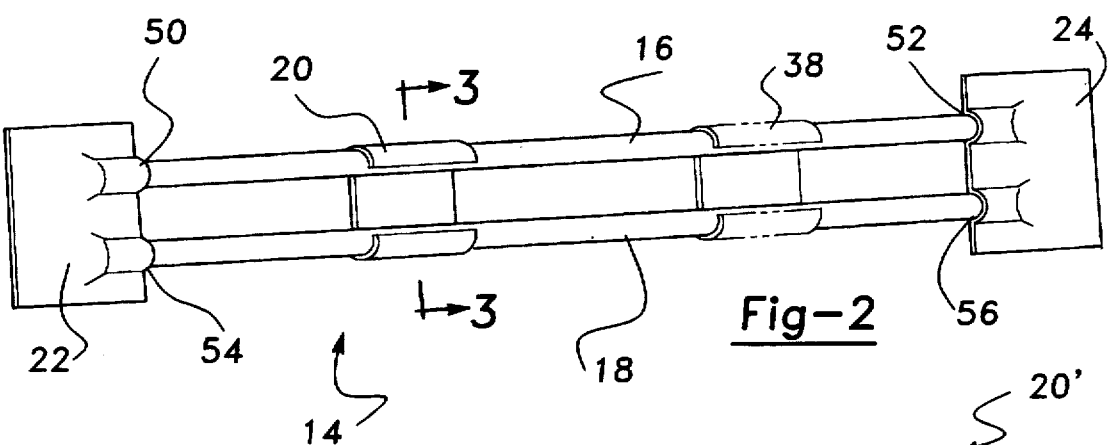
FIG. 2 is a perspective view of an impact beam assembly showing a preferred embodiment illustrating alternative positioning of clips.
Figure 3:
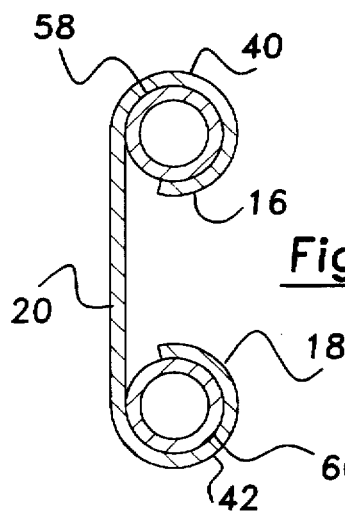
FIG. 3 is a cross-sectional view of a clip attached to a pair of beams according to a preferred embodiment of the present invention.
Figure 4:
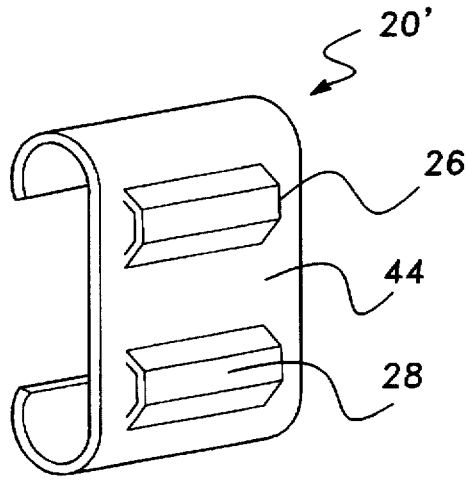
FIG. 4 is a perspective view of an alternative embodiment of a clip with a pair of tabs extending from the clip's surface.

Turning now to the drawings, and in particular to FIGS. 1, 2 and 3, an automotive vehicle body 10, has a vehicle door 12 hereshown as a front door. The vehicle door 12 is depicted as having a vehicle impact device 14 generally referred to in FIG. 2. The vehicle impact device 14, as shown in FIG. 2, has a pair of horizontally disposed beam members 16 and 18 (an upper and a lower respectively), with a clip 20 disposed thereon, the beam members being fixed to a pair of base plates 22 and 24. In an alternative embodiment, FIG. 4, a pair of tabs 26 and 28 are disposed on the inboard surface 44 of the clip 20.

The vehicle door 12 comprises an outer panel 30, an inner panel 32, and front and rear portions 34 and 35 respectively. The outer panel 30, inner panel 32, front and rear panels 34 and 35 are welded or otherwise suitably secured to one another and define a cavity 36 therein, as shown in FIGS. 1, 5–7. Within the cavity 36 is a window raising and lowering mechanism and other components such as lock hardware and wiring (not shown) disposed generally adjacent the inner panel 32. Window raising and lowering mechanisms, lock hardware, and wiring are well known in the art and therefore are not shown in detail.

A preferred embodiment of the present invention will now be described with reference to FIGS. 2 and 3. More specifically, FIG. 2 depicts an undeformed vehicle impact device 14. The device 14 extends longitudinally of the vehicle body 10 and is horizontally disposed within the door cavity 36 as shown in FIG. 1. The device has a pair of base plates 22 and 24 which are secured to the end panels 34 and 35, or any other suitable attachment location such as the inner or outer panels 32 and 30 respectively of the vehicle door 12. Attachment of the impact device 14 may be by any suitable means, such as being bolted, welded, or the like.

The impact device 14 comprises at least two structural beam members 16 and 18. These beam members 16 and 18 may take the form of steel rod or tubing, although it should be understood that they could be constructed of any high strength material, such as aluminum composite materials or the like. Further, the beam members 16 and 18 can have various cross-sectional shapes, such as oval or square, in addition to round. In the preferred embodiment, as shown in FIGS. 2 and 3, the beam members 16 and 18 are formed as tube members having a circular cross-section. The beam members 16 and 18 are preferably made of steel because of its availability and low cost. The beam members 16 and 18 are attached at ends 50, 52, 54, and 56 to base plates 22 and 24, respectively. The attachment means of the beam members 16 and 18 to the base plates 22 and 24, will vary depending on the requisite design constraints as to whether it would be a weld, interference fit, etc.

The impact device 14 as shown in FIG. 2, further includes a one piece clip with planar back surface 20 attached to the upper and lower most beam members 16 and 18 respectively. In a preferred embodiment, only one clip 20 is used but, those skilled in the art will realize that a second clip 38 or more may be used depending on design requirements. The clip 20 has an upper and lower end or flange portions 40 and 42 respectively. These flange portions 40 and 42 create a circular channel. The upper and lower surfaces 58 and 60 of the upper and lower beam members 16 and 18 are received in the circular channel created by the flange portions 40 and 42. The flange portions 40 and 42 substantially surround, or greater than two hundred seventy degree wrap, and thereby constrain relative vertical and lateral deflection of the upper and lower beam members 16 and 18. The clip 20 is slidingly adjustably positionable along the longitudinal axis of the beam members 16 and 18. The preceding embodiment of the impact device 14 is advantageous for a number of reasons. First, the vertical and lateral constraint of the beam members 16 and 18 by the clip 20 affords a predetermined substantially planar deflection upon imposition of a lateral loading of both beam members. If a point impact were to deflect only a single beam, a deflection of the loaded beam would occur, independent of the other beams, potentially deflecting beyond design specifications. If the same impact were to occur upon a single beam, with the impact device having the structure of the preferred embodiment, the clip 20 would function to enhance the capability of the impact device 14 to absorb energy as a unit rather than as independent members upon being bowed inwardly in the event of a lateral displacement. In other words, the preferred impact device 14 is capable of sustaining higher loads and absorbing greater energy for a given deformation or displacement, as compared to an identical impact device without the clip 20. Second, the adjustable positionability of the clip 20 has certain advantages. The consideration of global and local deformation in design would yield varying impact devices per different car lines. In the present embodiment, the adjustment of the clip 20 fore and aft along the longitudinal axes of the beam members 16 and 18 will yield different load deflection characteristics. Therefore, rather than redesigning and retooling for a new impact device for each car line, the clip 20 can simply be adjusted pursuant to design requirements and then welded or otherwise fixed in place.

FIGS. 4, 5, 6, and 7 show a second embodiment of a novel impact device 14 according to the present invention. In the alternate embodiment, the clip 20' has tabs 26 and 28 mounted on the inboard surface 44 thereof. The tabs 26 and 28 may vary in number and structure and still accomplish the foregoing objectives. As depicted in FIG. 5, in an undeformed state, a vehicle door 12 according to an alternate embodiment comprises an outer panel 30, an inner panel 32, a trim panel 46, upper and lower beam members 16 and 18, a clip 20, and a pair of tabs 26 and 28 on the clip 20. As depicted in FIG. 6, upon imposition of a side load 48 to the outer panel 30 the tabs 26 and 28 facilitate advanced contact with the inner panel 32. This advanced contact with the inner panel 32 in turn facilitates advanced contact with the trim panel 46 via the inner panel, thereby releasing the trim panel from the inner panel as depicted in FIG. 7. As a result, the trim panel 46 begins to move an occupant in a direction away from the lateral load 48 at a sooner point in time.

While only certain embodiments of the present invention have been described others may occur to those in the automotive vehicle body arts which do not depart from the scope of the following claims.

We claim:

1. A vehicle door assembly, comprising:
   a trim panel;
   an inner door panel;
   an outer door panel attached thereto defining a cavity therebetween;
   an energy management device disposed within said cavity, including:
   at least two elongated deflectable beam members, each of said at least two elongated deflectable beam members having a longitudinal axis extending from a first end to a second end and an upper surface and lower surface disposed along said longitudinal axes, each of said at least two elongated deflectable beam members attached at said first end and said second end to said vehicle door within said cavity;
   at least one clip member, having an upper flange portion forming an upper channel and a lower flange portion forming a lower channel and a clip back surface adjacent to said inner door panel, said upper channel of said upper flange portion abuttingly engaging said upper surface of an uppermost beam member and said lower channel of said lower flange portion abuttingly engaging said lower surface of a lowermost beam member, said clip member being adjustably positionable along the longitudinal axes of said beam members, so as to restrain said beam members against vertical and lateral deflection upon imposition of a lateral load; and
   at least one tab member of predetermined size, disposed on said clip back surface, so as to facilitate deployment of said trim panel from said inner door panel.

2. The vehicle door of claim 1 wherein, said at least two elongated deflectable beam members have a circular cross section.

3. A vehicle door assembly, comprising:
   a trim panel;
   an inner door panel;
   an outer door panel attached thereto defining a cavity therebetween;
   an energy management device disposed within said cavity, including:
   at least two elongated deflectable beam members, each of said at least two elongated deflectable beam members having a longitudinal axis extending from a first end to a second end and an upper surface and lower surface disposed along said longitudinal axes, each of said at least two elongated deflectable beam members attached at said first end and said second end to said vehicle door within said cavity;
   at least one, one piece, clip member, having an upper flange portion forming an upper channel and a lower flange portion forming a lower channel and a planar clip back surface adjacent to said inner door panel, said upper channel of said upper flange portion received in a substantially surrounding relationship, greater than two hundred seventy degrees, over an uppermost beam member and abuttingly engaging said upper surface of said uppermost beam member and said lower channel of said lower flange portion received in substantially surrounding relationship, greater than two hundred seventy degrees, over a lowermost beam member and abuttingly engaging said lower surface of said lowermost beam member, said unitary clip member being adjustably positionable along the longitudinal axes of said beam members, so as to restrain said beam members against vertical and lateral deflection upon imposition of a lateral load.

4. The vehicle door of claim 3 wherein, said at least two elongated deflectable beam members are substantially tubular.

* * * * *